United States Patent [19]
Morishita et al.

[11] Patent Number: 4,635,741
[45] Date of Patent: Jan. 13, 1987

[54] POWER STEERING APPARATUS

[75] Inventors: Mitsuharu Morishita; Tadayuki Hara; Shinichi Kohge; Tetsushi Watanabe, all of Himeji; Yasuki Ikari, Hiroshima, all of Japan

[73] Assignee: Mitsubishi Denki Kabushiki Kaisha, Tokyo, Japan

[21] Appl. No.: 770,184

[22] Filed: Aug. 28, 1985

[30] Foreign Application Priority Data

Sep. 7, 1984 [JP] Japan .......................... 59-136424[U]

[51] Int. Cl.[4] .............................................. B62D 5/04
[52] U.S. Cl. .................................. 180/79.1; 73/862.33
[58] Field of Search ........................... 180/79.1, 142; 73/862.33; 74/388 PS

[56] References Cited

U.S. PATENT DOCUMENTS 3,893,534  7/1975  Steinmann ...................... 180/79.1
3,983,953  10/1976  Bayle ............................. 180/79.1
4,448,275  5/1984  Kitagawa et al. ............. 180/79.1

FOREIGN PATENT DOCUMENTS 1075864  2/1960  Fed. Rep. of Germany ... 73/862.33
13010  of 1910  United Kingdom ............ 73/862.33

Primary Examiner—John J. Love
Assistant Examiner—Donn McGiehan
Attorney, Agent, or Firm—Wenderoth, Lind & Ponack

[57] ABSTRACT

A power steering apparatus for an automobile or other vehicle has a steering shaft constituted by an input section and an output section connected by a torsion bar. A mechanism for detecting when a driver is imparting torque to the steering wheel of the vehicle is constituted by a potentiometer having a resistive element and a wiper arm, one of which is mounted on the output section and the other of which is mounted on the torsion bar so that the wiper arm will rotate with respect to the resistive element and the resistance of the potentiometer will change when the torsion bar is rotated with respect to the output section. The potentiometer is electrically connected to a preamplifier mounted on the steering shaft, and the preamplifier is electrically connected to slip rings through which its output can be supplied to a stationary control unit. The electrical output of the potentiometer is independent of the speed of rotation of the steering wheel.

1 Claim, 3 Drawing Figures

POWER STEERING APPARATUS

BACKGROUND OF THE INVENTION

This invention relates to a power steering apparatus for an automobile or other vehicle. More particularly, it relates to a power steering apparatus having an improved mechanism for detecting when the driver of the vehicle is imparting torque to the steering wheel of the vehicle.

In a power steering apparatus for an automobile, when the driver applies torque to the steering wheel of the automobile, the steering shaft is caused to undergo an initial slight rotation. The rotation is detected by a rotation detecting mechanism, and a motor is energized in response to this initial rotation to rotate the steering shaft and decrease the force which must be exerted by the driver. Various mechanisms have been proposed for detecting the rotation of steering shafts, including those using strain gauges and induction potentiometers.

For example, Japanese Laid Open Patent Application No. 46-35779 discloses a power steering apparatus in which the torque applied to a steering shaft is detected by strain gauges disposed on a rotating shaft which is disposed in parallel to the steering shaft and which is driven by the steering shaft through gears. However, strain gauges are difficult to install and calibrate, and have the further disadvantage of being sensitive to changes in temperature.

Japanese Patent No. 1038166 discloses a power steering apparatus in which the rotation of a steering shaft produces a change in the magnetic resistance of a magnetic circuit comprising a metallic bracket mounted on the steering shaft and a stationary pole which surrounds the steering shaft. The change in magnetic resistance produces a change in the inductance between a primary coil and a secondary coil wrapped around the bracket. An alternating current is applied to the primary coil, and the change in the induced voltage in the secondary coil as a result of the change in inductance is measured to detect the rotation of the steering shaft. However, that invention has the disadvantage that the output of the secondary coil is dependent on the speed of rotation of the steering shaft and is not stable. Furthermore, the output of the secondary coil, which rotates with the steering shaft, is input to a stationary member via an output lead which is wrapped around the steering shaft. There is the thus the possibility of the output lead becoming entangled with the steering shaft or other member and being severed.

SUMMARY OF THE INVENTION

It is an object of the present invention to overcome the above-described problems of the prior art and to provide a power steering apparatus for an automobile or other vehicle which has a mechanism for detecting when the driver is imparting torque to the steering wheel of the vehicle and for producing a corresponding electrical output which is not dependent on the speed of rotation of the steering shaft.

It is another object of the present invention to provide a power steering apparatus in which the mechanism for detecting torque is electrically connected to stationary members in a manner such that there is no fear of wires becoming entangled with the steering shaft or other parts when the steering shaft is rotated.

It is yet another object of the present invention to provide a power steering apparatus in which the mechanism for detecting torque has a very simple structure.

In a power steering apparatus according to the present invention, a mechanism for detecting when a driver is imparting torque to the steering wheel of the vehicle comprises a potentiometer which is mounted on the steering shaft in a manner such that its resistance is varied when torque is applied to the steering shaft. A voltage is applied to the potentiometer, and the output of the potentiometer, which indicates the magnitude of the torque applied to the steering shaft, is amplified by a preamplifier mounted on the steering shaft. The output of the preamplifier is output to stationary members outside a steering column via slip rings mounted on the steering shaft. Accordingly, the output of the torque detecting mechanism is independent of the speed of rotation of the steering shaft, and as the electrical output of the preamplifier is output via slip rings, there are no wires which can become entangled and severed by the rotation of the steering shaft.

BRIEF DESCRIPTION OF THE DRAWINGS

In the figures, the same reference numerals indicate the same or corresponding parts.

DESCRIPTION OF THE PREFERRED EMBODIMENT

Figure 1:
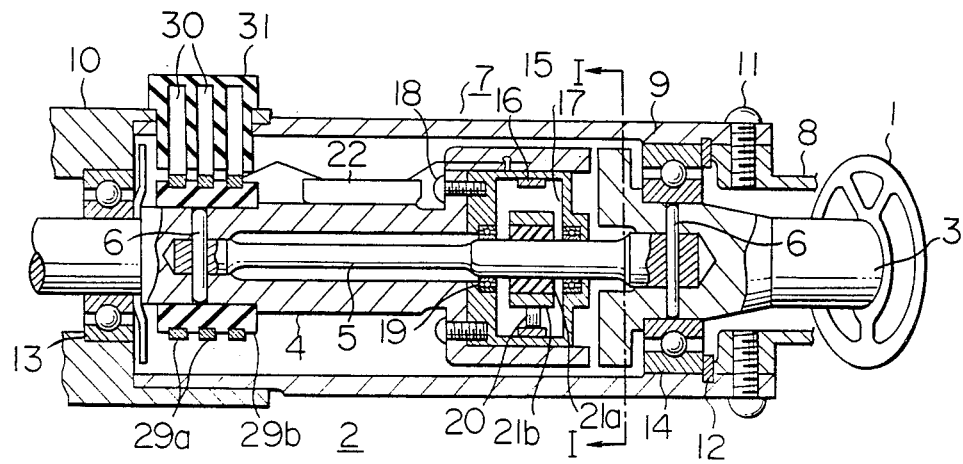
FIG. 1 is a longitudinal cross-sectional view of a portion of an embodiment of a power steering mechanism according to the present invention.
Figure 2:
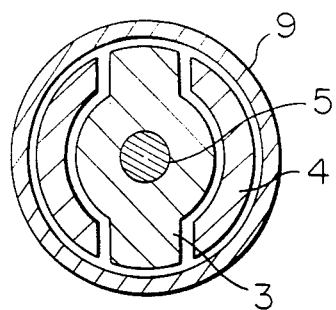
FIG. 2 is a cross-sectional view of the embodiment of FIG. 1 taken along Line I—I of FIG. 1.

An embodiment of a power steering apparatus for an automobile according to the present invention will now be described while referring to the accompanying drawings. As shown in FIG. 1, which is a longitudinal cross-sectional view of this embodiment, a steering wheel 1 is secured to one end of a rotatably supported steering shaft 2, the steering shaft 2 comprising an input section 3, an output section 4, and a torsion bar 5. The input section 3 and the output section 4 are connected with one another by the torsion bar 5, which is connected at its ends to the input section 3 and the output section 4 by pins 6, although splines or other means may be used instead. The input section 3 and the output section 4 both have hollow centers over a portion of their lengths, and the torsion bar 5 is housed within the hollow centers. As shown in FIG. 2, which is a cross-sectional view taken along Line I—I of FIG. 1, the input section 3 and the output section 4 overlap one another in the axial direction in the portion of the apparatus near where the torsion bar 5 is connected to the input section 3. In the overlapping region, the output section 4 substantially surrounds the input section 3. A gap in the circumferential direction is provided between the input section 3 and the output section 4 in the overlapping region so that normally they will not contact one another and torque will be transmitted from one to the other via the torsion bar 5. However, if the twisting of the torsion bar 5 due to the torque applied thereto exceeds a certain value, the input section 3 and the output section 4 will contact one another, and torque will be directly transmitted from the one to the other, preventing excessive torsional stresses from developing in the torsion bar 5.

The steering shaft 2 is rotatably supported by a steering column 7 which is secured to the chassis of the automobile. The steering column 7 comprises a first cylindrical portion 8, a second cylindrical portion 9, and a third cylindrical portion 10. The first cylindrical portion 8 is secured to the second cylindrical portion 9 by bolts 11, and the second cylindrical portion 9 is press fit into the third cylindrical portion 10 so that all three portions are coaxially disposed.

The second cylindrical portion 9 has a ball bearing 14 secured to its inner periphery which journals the input section 3 of the steering shaft 2, while the third cylindrical portion 10 has a ball bearing 13 which journals the output section 4. A retaining ring 12 is disposed in the second cylindrical portion 9 adjacent to the ball bearing 14.

The output section 4 of the steering shaft 2 is connected to an unillustrated wheel drive portion in a conventional manner so that the rotation of the output section 4 will change the direction in which the wheels of the automobile point. Furthermore, an unillustrated motor is connected to the output section 4 so that when the motor is driven it will rotate the output section 4 and the force required to turn the steering wheel 1 will be lessened.

A mechanism for detecting the application of torque to the steering wheel 1 comprises a potentiometer 15 and a preamplifier 22. The potentiometer 15 is disposed around the torsion bar 5 near the end which is connected to the input section 3. The potentiometer 15 comprises a resistive element 16 having an annular shape which is secured to the inside surface of a cylindrical frame 17 which in turn is secured to the output section 4 by screws 18 so as to rotate therewith. The frame 17 is rotatably supported by ball bearings 19 mounted on the torsion bar 5. The wiper arm 20 of the potentiometer 15 is rigidly mounted on a supporting ring 21 comprising an electrically insulating ring 21a which is rigidly secured to the outer surface of the torsion bar 5 and an electrically conducting ring 21b which surrounds and is rigidly secured to the electrically insulating ring 21a. One end of the wiper arm 20 is secured to the electrically conducting ring 21b, and the other end is in electrical and sliding contact with the resistive element 16 so that the wiper arm 20 and the resistive element 16 can rotate with respect to one another while still maintaining electrical contact when the torsion bar 5 rotates with respect to the output section 4. It is also possible to structure the potentiometer 15 so that the resistive element 16 is mounted on the torsion bar 5 and the wiper arm 20 is mounted on the output section 4.

Figure 3:
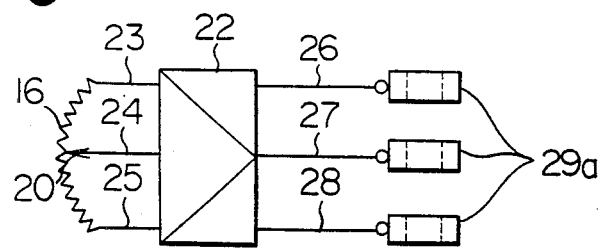
FIG. 3 is a schematic view of the connection between the preamplifier and the potentiometer of FIG. 1.

The preamplifier 22 is rigidly mounted on the output section 4 so as to rotate therewith and is electrically connected to the potentiometer 15 and to three slip rings 29a which are mounted in an electrically insulating support ring 29b which is rigidly secured to the outer surface of the output section 4. The slip rings 29a enable power to be supplied to the preamplifier 22 and enable its output to be removed to the outside of the steering column 7. As shown in FIG. 3, the preamplifier 22 has three input leads 23–25 and three output leads 26–28. The three output leads 26–28 are connected to the three slip rings 29a. Two of the input leads 23 and 25 are connected to opposite ends of the resistive element 16, while the other input lead 24 is electrically connected to the wiper arm 20 via brush which is not visible in the drawing which is in electrical and sliding contact with the electrically conducting ring 21b. The electrical output from the preamplifier 22 is passed to a stationary member outside the steering column 7 via the slip rings 29a which are in sliding contact with three brushes 30 mounted in a brush holder 31 which is rigidly secured to the steering column 7. The brushes 30 are electrically connected to an unillustrated conventional control mechanism for controlling the previously-mentioned motor of the apparatus.

The operation of this apparatus is as follows. When a driver turns the steering wheel 1, the input section 3 of the steering shaft 2 will rotate with respect to the output section 4 and a torsional moment will be applied to the torsion bar 5, causing it to twist by a small angle. The twisting of the torsion bar 5 will cause the wiper arm 20 mounted on the torsion bar 5 to rotate with respect to the resistive element 16, changing the resistance between the input leads of the preamplifier 22 and changing the voltage at input lead 24. The preamplifier 22 produces an output signal having a current corresponding to the output voltage of input lead 24, and this output signal is output via the slip rings 29a to the previously-mentioned conventional control mechanism. Based on the magnitude of the output signal, the control mechanism controls the operation of the motor so as to rotate the output section 4 of the steering shaft 2 and decrease the steering force required by the driver.

The magnitude of the output signal from the preamplifier 22 is dependent only upon the amount of rotation of the wiper arm 20 with respect to the resistive element 16 and does not depend on the speed of rotation. Therefore, a stable electrical output can be obtained from the preamplifier 22 at all times. Furthermore, as the only connecting wires are the input and output leads connecting the preamplifier 22 with the potentiometer 15 and the slip rings 29a, and since these wires rotate with the output section 4, there are no wires which can become entangled with the steering shaft 2 when it rotates, and there is no possibility of these wires being broken.

During normal operation, the motor acts to rotate the output section 4 of the steering shaft 2 as soon as the rotation of the input section 3 is detected. Accordingly, the angle of twist of the torsion bar 5 is normally quite small and a large torque is not applied to it. However, if the motor or other portion should fail so that the steering force must be applied entirely by hand, the angle of twist between the input section 3 and the output section 4 will increase. As the input section 3 and the output section 4 overlap one another as shown in FIG. 2, they will contact one another when the angle of twist reaches a certain value, and torque will be transmitted directly from the input section 3 to the output section 4. Therefore, there is no possibility of the torsion bar 5 being overstressed during manual operation.

In the above embodiment, although the torsion bar 5 is shown as being disposed inside the output section 4, it can also be a cylindrical member which surrounds the output section 4.

What is claimed is:

1. A power steering apparatus comprising:
    a rotatably supported steering shaft having an input section adapted to be driven by a steering wheel, an output section, and a torsion bar which is connected between said input section and said output section and is disposed coaxially therewith;
    a potentiometer comprising a generally annular resistive element and a wiper element which is in electrical and sliding contact with said resistive element, one of said elements being secured to said output section and the other of said elements being secured to said torsion bar such that when said torsion bar is rotated with respect to said output section, said wiper element will move with respect to said resistive element while maintaining electrical contact therewith, and brush means in electrical brushing contact with the element which is on said torsion bar;

a preamplifier on said output section and electrically connected with said brush means and said element which is on said output section;

three slip rings secured to the outer periphery of said output section and electrically connected to said preamplifier for connecting two of the slip rings to said resistive element and the third slip ring to said wiper element; and stationary brushes outside said output element which are in sliding electrical contact with said slip rings.

* * * * *